May 31, 1949.    K. A. LANG    2,471,822
CURRENT CONTROL APPARATUS
Filed April 11, 1945

Inventor:
Karl A. Lang,
By Dawson, Ooms and Borth,
Attorneys.

Patented May 31, 1949

2,471,822

UNITED STATES PATENT OFFICE 2,471,822

CURRENT CONTROL APPARATUS

Karl A. Lang, Glenview, Ill., assignor to Lindberg Engineering Company, Chicago, Ill., a corporation of Illinois Application April 11, 1945, Serial No. 587,797

8 Claims. (Cl. 323—7)

1

This invention relates to current control apparatus and more particularly to apparatus for supplying constant current to a load from a supply source whose voltage may vary.

One of the objects of the invention is to provide a current control apparatus which will produce constant current regardless of slight variations of voltage in the supply source.

Another object is to provide a resonant type current control apparatus in which the current increases resulting from increases in supply voltage are variably compensated in the resonant circuit in response to voltage changes in the supply source in a direction to maintain the current output substantially constant.

Still another object is to provide a resonant type current control apparatus in which the capacitor elements of the resonant circuit are connected across inductively coupled windings on a core whose saturation is varied in response to changes in the supply voltage. In the preferred construction, a saturating winding on the core is connected to the supply source through a circuit including amplifying means to vary the saturating current at an amplified rate in response to supply voltage changes.

The above and other objects and advantages of the invention will be more readily apparent from the following description when read in connection with the accompanying drawing in which—

Figure 1:
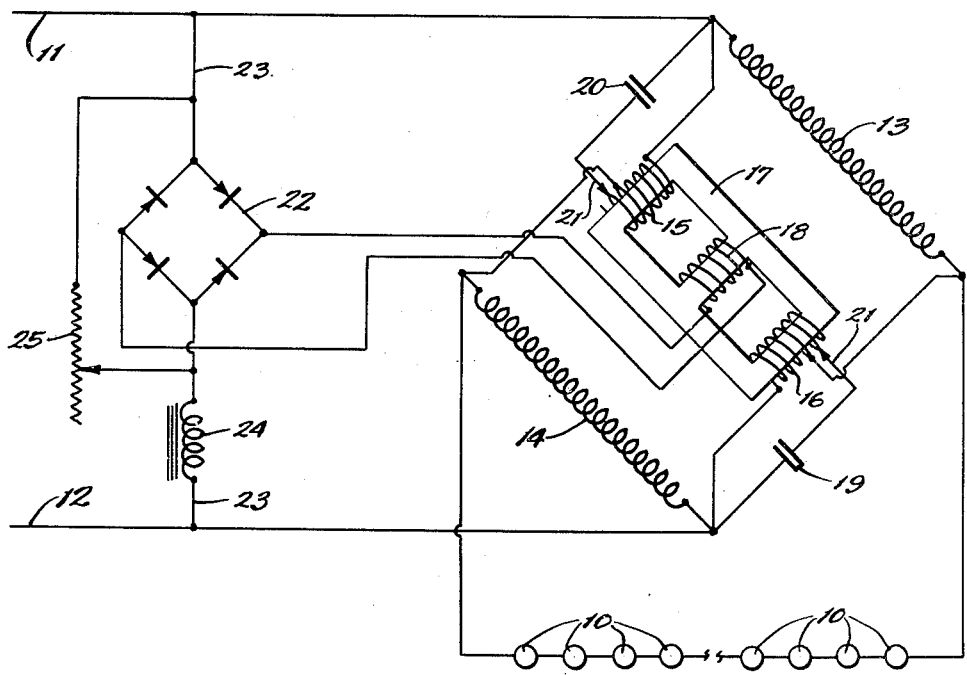
Figure 1 is a diagram of a circuit embodying the invention.

The circuit shown in Figure 1 is adapted to supply constant current to a load illustrated as a plurality of series connected electric lamps 10 from an alternating current supply source including supply leads 11 and 12. The regulating apparatus, as shown, is similar to that more particularly described and claimed in my co-pending application Serial No. 573,977, filed January 22, 1945, now Patent 2,405,837, and includes a pair of inductive reactors 13 and 14. One end of each reactor is connected to one of the supply leads 11 or 12 and the opposite end is connected to one side of the load circuit, as shown.

A pair of windings 15 and 16 are connected across the reactors 13 and 14 in a bridge circuit, the connections to the windings being such as to leave an extension of the winding beyond the connection to one of the reactors, as shown. The windings 15 and 16 are mounted on a common

2 three legged core 17 which also carries on its central leg a saturating winding 18.

The resonant circuit is completed by a pair of condensers 19 and 20 connected at one side of the supply circuit ends of the reactors 13 and 14 respectively. The other side of each condenser terminates in a wiper 21 adjustably engaging the windings 15 and 16. By this construction, the effective capacity in the circuit may be varied to provide a power factor adjustment and to compensate for condenser manufacturing variations.

In normal operation of the device with a constant voltage across the supply leads 11 and 12, the reactors and condensers function as a monocyclic square to maintain a constant current in the load circuit. As explained in my application Serial No. 573,977 the windings 15 and 16 serve to balance the capacitors 19 and 20 to maintain their effective values substantially equal and to limit the open circuit voltage in the load circuit. With this circuit, as so far described, variations of voltage across the supply circuit will tend to cause variations of current in the output circuit even though such variations are compensated for to some extent by the windings 15 and 16.

In order to compensate more fully for voltage variations, the saturating current in the saturating winding 18 is varied in response to voltage changes across the supply leads. For this purpose, the saturating winding is connected to a full wave rectifier 22 which is connected by leads 23 across the supply circuit. A saturating reactor 24 is connected in series in one of the leads 23 and is preferably so designed that it will normally operate above the knee of its saturation curve. With this construction, relatively small changes in voltage will produce amplified changes in current flow through the rectifier and the saturating winding. This increases the saturation of the core 17 at a relatively rapid rate on an increase in supply voltage to reduce the impedance of the windings 15 and 16 so that more current will flow through these windings to compensate for the increased current in the capacitors and reactors resulting from an increased supply voltage. By proper adjustment of the values of the several circuit elements, I have found that the current in the output circuit can be maintained constant within very close limits under input voltage fluctuations up to 10% or more from normal.

Preferably, the current flow through the saturating winding and the voltage across the rectifier are limited by providing an adjustable rheostat in circuit with either the input or output side of the rectifier. As shown, a rheostat 25 is connected across the rectifier input to limit the voltage drop across the rectifier thereby to limit the saturating current in the winding 18. The rheostat 25 can be adjusted to vary the load current and can, if desired, be employed for dimming control or the like.

Figure 2:
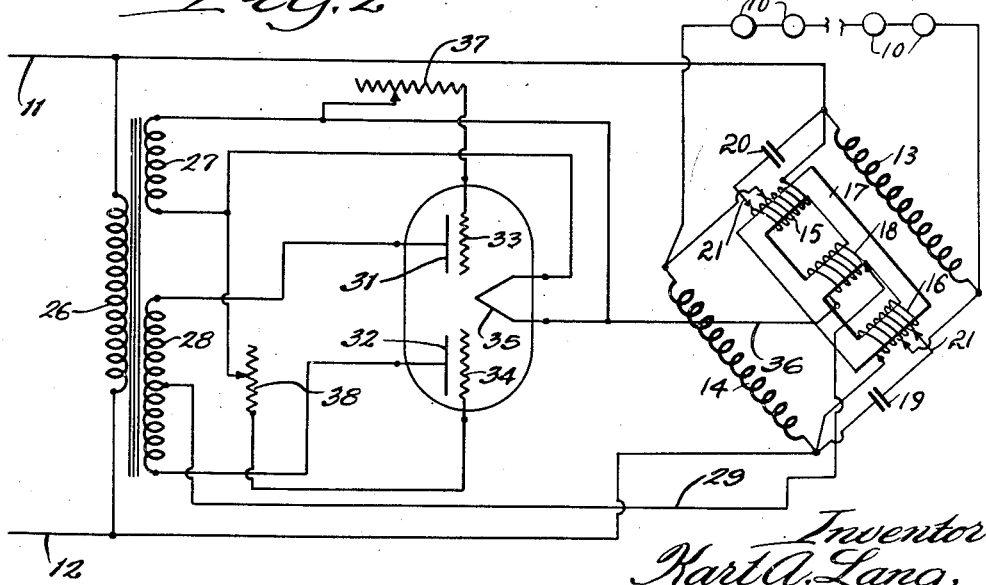
Figure 2 is a partial circuit diagram of an alternative arrangement.

Figure 2 illustrates an alternative construction in which the rectifier 22 and saturating reactor 24 are replaced by a combined amplifying and rectifying circuit. As shown in this figure, a transformer primary winding 26 is connected across the supply leads 11 and 12 and has a pair of secondary windings 27 and 28 thereon. The winding 28 has a center tap connected to a lead 29 which forms one side of the circuit for supplying saturating current to the winding 18. The outer ends of the winding 28 are connected to the plates 31 and 32 in a double electron discharge tube indicated as a double triode having control grids 33 and 34 and a common cathode 35. The cathode 35 is connected to a lead 36 which forms the other side of the circuit for the saturating winding 18.

The cathode is connected directly across the second winding 37 to provide a heater circuit therefor and the winding 27 is also utilized as the control winding for the grids 33 and 34. For this purpose, the grid 33 is connected to one side of the winding 27 through a rheostat 37 and the grid 34 is similarly connected to the other side of the winding 27 through a rheostat 38. By adjusting the rheostats 37 and 38 the current output of the tube may be varied to vary the saturating current.

This device functions in substantially the same manner as the arrangement shown in Figure 1 to supply a rectified saturating current which varies at an amplified rate in response to voltage changes across the supply leads.

While two embodiments of the invention have been shown and described in detail, it will be understood that these embodiments are illustrative only and are not intended as a definition of the scope of the invention, reference being had for this purpose to the appended claims.

What is claimed is:

1. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, and means connecting the saturating winding to the supply source to vary the current in the saturating winding in response to voltage variations in the supply source.

2. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, a circuit connecting the saturating winding to the supply source, and means in the circuit responsive to the voltage across the supply source to cause the current flow through the saturating winding to vary at a more rapid rate than the supply source voltage varies.

3. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, a circuit connecting the saturating winding to the supply source, and amplifying means in the circuit responsive to the voltage across the supply source.

4. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, rectifying means connected to the saturating winding, a circuit connecting the rectifying means to the supply source, and a saturable reactor in the circuit.

5. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, rectifying means connected to the saturating winding, a circuit connecting the rectifying means to the supply source, a saturable reactor in the circuit, and a limiting resistor connected in circuit with the rectifying means.

6. Current control apparatus comprising a pair of reactors having one end of each connected to a supply source and the other end of each connected to a load, a pair of inductively coupled windings wound on a common core and connected in a bridge circuit to the reactors, a capacitor connected across at least one of the windings, a saturating winding on the core, an electron discharge tube having a plate circuit connected to the saturating winding, a control grid in the tube, and means connecting the grid to the supply source to control the current in the saturating winding in response to voltage changes in the supply source.

7. Current control apparatus comprising a monocyclic square including a pair of reactors and a pair of condensers, opposite corners of the square being adapted to be connected to a supply source and the remaining corners to a load, a magnetic core, a pair of windings on the core connected across the condensers respectively, a saturating winding on the core, and means connecting the saturating winding to the supply source to vary the saturating current in response to voltage changes in the supply source.

8. Current control apparatus comprising a monocyclic square including a pair of reactors and a pair of condensers, opposite corners of the square being adapted to be connected to a supply source and the remaining corners to a load, a magnetic core, a pair of windings on the core connected across the condensers respectively, a saturating winding on the core, and amplifying means connecting the saturating winding to the supply source to vary the saturating current at an amplified rate in response to voltage changes in the supply source.

KARL A. LANG.

(References on following page)

REFERENCES CITED

The following references are of record in the file of this patent:

UNITED STATES PATENTS

| Number | Name | Date |
|---|---|---|
| 1,824,577 | Sorensen | Sept. 22, 1931 |
| 1,965,439 | Stoller | July 3, 1934 |
| 2,057,520 | Gulliksen | Oct. 13, 1936 |
| 2,149,092 | Kettler | Feb. 28, 1939 |
| 2,395,515 | Stoller | Feb. 26, 1946 |
| 2,405,837 | Lang | Apr. 13, 1946 |
| 2,426,937 | Lang | Sept. 2, 1947 |